Sept. 28, 1954     L. LISENBEE     2,690,077
ADJUSTABLE GAS METER HOUSING
Filed Jan. 10, 1951
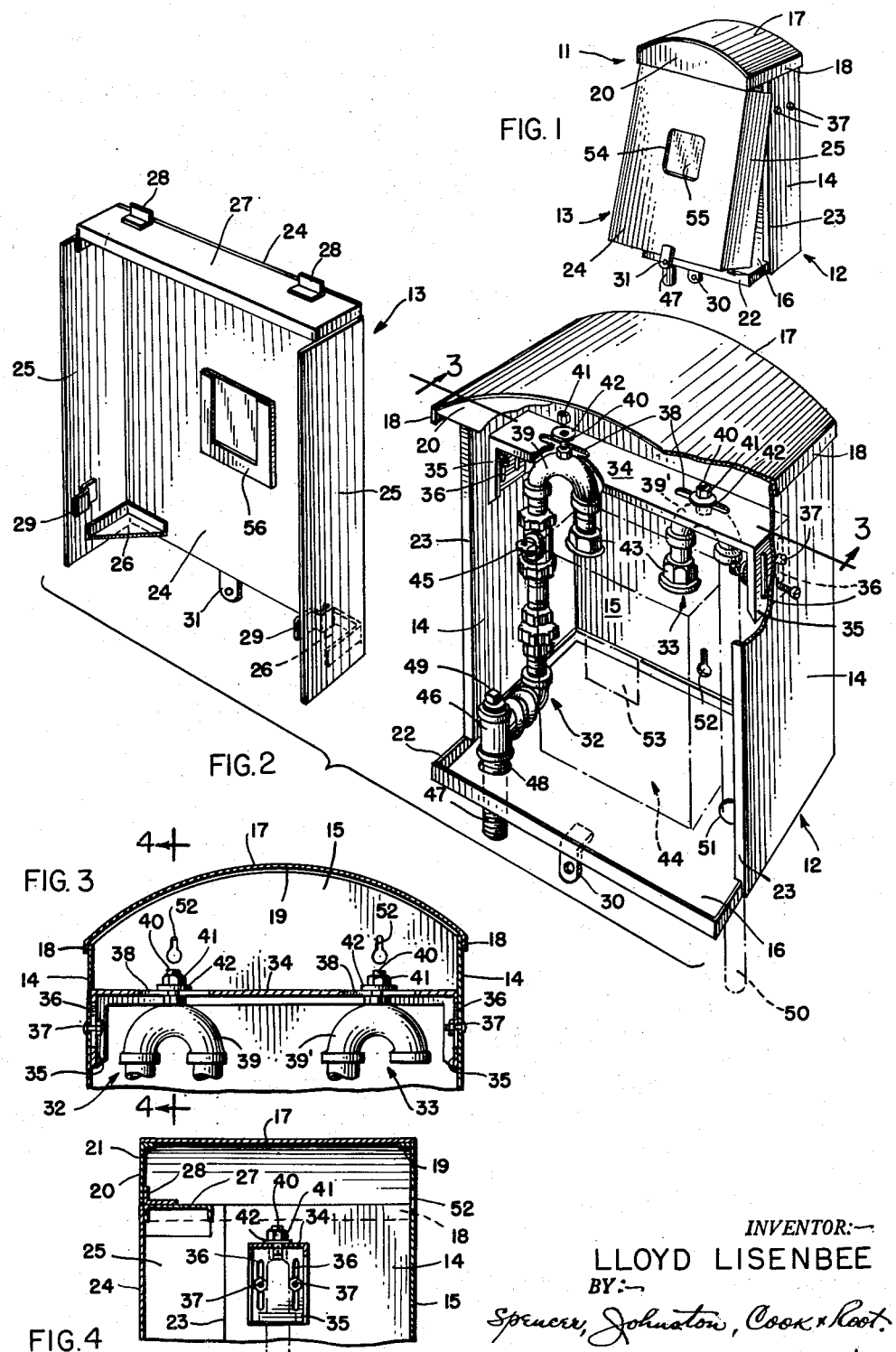
INVENTOR:—
LLOYD LISENBEE
ATT'YS Patented Sept. 28, 1954

2,690,077

UNITED STATES PATENT OFFICE 2,690,077

ADJUSTABLE GAS METER HOUSING

Lloyd Lisenbee, Macomb, Ill.

Application January 10, 1951, Serial No. 205,383

12 Claims. (Cl. 73—201)

The present invention relates in general to housings or containers and has more particular reference to an improved housing for meters, especially gas meters.

It is conventional, in metering gas supplied to domestic and industrial customers, to provide a gas supply conduit into the building in which the gas is used, and to connect a meter in the supply pipe at the point where it enters the building, as in the basement of a gas supplied building, the meter being thus housed from the weather, within the building, in position for periodic reading to determine the amount of gas supplied therethrough. Meters are frequently so installed in relatively inaccessible locations, thereby hampering meter reading activities, especially where access to the building in which the meter is installed is unattainable in the absence of the owner or caretaker personnel, thereby requiring repeated visits and consequent time loss by the meter reader in order to obtain access to the meter for reading purposes.

The installation of meters within a building usually provides access to a portion of the gas supply pipe in advance of the meter, such accessible portion of the supply pipe frequently comprising one or more coupled sections susceptible of being tapped easily in advance of the meter.

An important object of the present invention is to provide for the mounting of meters, particularly gas meters, in position on or adjacent and outwardly of a gas supplied building whereby the meter will be at all times accessible for meter reading purposes whether or not access to the supplied building may be had, and whereby tapping of the supply line in advance of the meter is rendered appreciably difficult if not substantially impossible.

Another important object is to provide for the outdoor mounting of meters, particularly gas meters requiring periodic reading while adequately enclosing and housing the same against adverse weather conditions; a further object being to provide an enclosed, substantially tamper-proof meter housing adapted to be permanently sealed in condition forming a weatherproof meter housing and excluding access to the meter therein to all except authorized service personnel, while permitting inspection of the meter for meter reading purposes while the housing remains in sealed condition.

Another important object is to provide an enclosed housing provided with meter mounting means therein, said mounting means being adjustable to accommodate various meters of unlike size and configuration whereby housings may be fabricated to selected standard dimensions and yet be adjustable to receive any conventional meter.

Another important object is to provide an adjustable meter housing fitted with an inlet pipe section adapted for connection with the inlet side of a meter and adapted to be joined outwardly of the housing directly to a supply conduit, said inlet pipe section embodying pipe fittings, such as a coupling, a valve and a removable testing plug disposed within the housing and hence not accessible after the housing shall have been sealed.

Another important object is to provide a preferably sheet metal housing embodying an enclosure for the reception of a meter and a removable cover whereby a meter may be assembled in the housing and interconnected with conduit means in the housing and extending outwardly thereof for connection with supply conduits outwardly of the housing, the housing being provided with a sight window in position allowing inspection of the enclosed meter, for meter reading purposes, from outwardly of the housing.

Another important object is to provide a housing comprising a generally box-like open front enclosure having side walls terminating short of the front of the enclosure to thereby facilitate the assembly of a meter in the enclosure and the connection thereof with inlet and outlet conduit means, the housing including a demountable, preferably sheet metal cover or closure formed for interlocking engagement with the enclosure for covering and sealing the open front thereof.

The foregoing and numerous other important objects, advantages and inherent functions of the invention will become apparent as the same is more fully understood from the following description which, taken in connection with the accompanying drawings, discloses a preferred embodiment of the invention.

Referring to the drawings:

Fig. 1 is a perspective view of a housing structure embodying the present invention;

Fig. 2 is an enlarged perspective view showing the box-like enclosure and its demountable cover forming the housing of the present invention; and Figs. 3 and 4 are sectional views, respectively, taken substantially along the lines 3—3 in Fig. 2 and 4—4 in Fig. 3.

To illustrate the invention, the drawings show an enclosed housing 11 adapted to be mounted and supported in any convenient location for the reception of a meter to be housed, said housing comprising a generally box-like enclosure 12 having an open front and a demountable cover 13 for closing the open front of the enclosure. The enclosure 12 and cover 13 are preferably formed of sheet metal parts suitably secured together, as by welding or otherwise, although it will be obvious that the housing may comprise any suitable material. As shown, the enclosure comprises spaced vertical side walls 14, a back wall 15, bottom wall 16 and a top wall 17. The top wall 17 is preferably of arched or upwardly bowed configuration for moisture shedding purposes, the opposite side edges of the top wall being flanged to provide dependent lips 18 overlying the upper edges of the side walls 14 and secured thereto in any suitable fashion, as by means of welding. The upper portions of the wall 15 extend within the curvature of the top wall 17, the upper edge of the rear wall being inwardly bent to provide flanged means 19 underlying and secured to the curved top wall along the rear edge thereof. A segmentally shaped member 20, having an upwardly facing curved edge, is secured to the top member 17 along the forward upwardly bowed edge thereof, said member 20 being inwardly bent at and along its curved edge to provide flange means 21 underlying and secured to the curved top wall along the front edge thereof. The bottom wall 16 is preferably formed with upstanding peripheral flanges 22 at the marginal edges of the bottom wall, said flanges extending within and being welded or otherwise secured to the lower edge portions of the side and back walls 14 and 15. The forward edges of the side walls 14 terminate short of the forward edges of the bottom and top walls 16 and 17, the forward edges of the side walls 14 being preferably formed with inwardly extending flanges 23.

The cover 13 preferably comprises a metal sheet forming a front panel 24 and integral side panels 25 bent substantially at right angles from and with respect to the front panel, the side and front panels being braced and secured in position, preferably by sheet metal angle brackets 26, applied in the cover structure in position spaced upwardly of the lower edge of the panels 24 and 25, said brackets being preferably secured in place as by welding or otherwise. A transverse bracing member 27, preferably of formed sheet metal and providing dependent marginal flanges, is secured as by welding or otherwise in the upper portions of the cover 13 behind the upper edge of the panel portion 24 and between the upper ends of the side panels 25, said side panels terminating below the upper edge of the panel 24 a distance substantially equal to the projection of the flanges 18 of the enclosure 12 below the downwardly facing edge of the member 20. The bracing member 27 is preferably formed with a pair of upstanding latch lugs 28 spaced rearwardly of the plane of the front panel 24 and extending upwardly of the member 27. Said lugs, if desired, may be formed by pressing portions of the member 27 upwardly therefrom, during the formation of the member, or the lugs as shown may be separately formed and secured to the member 27 in any suitable fashion, as by welding. A pair of holding clips 29 comprising bent metal pieces are welded or otherwise attached on the inner face of the side panels 25 adjacent the lower ends of the panels.

The cover may be applied to the enclosure 12 by first disposing the upper end of the cover beneath the lower edge of the enclosure member 20, with the upstanding clips 28 interlocked behind the said lower edge in the position shown in Fig. 1. The lower end of the cover may then be moved rearwardly to engage the lower ends of the panels 24 and 25 with the exposed flange portions 22 of the bottom wall of the enclosure. The parts may be secured and held together in relatively closed position by any suitable fastening or sealing means applied at a dependent lug 30 formed on the bottom wall 16 of the enclosure 12, at the forward edge of said bottom wall, and a cooperating dependent lug 31 formed on the cover, at the lower edge thereof, in position to register with the lug 30.

When the cover is in closed position, the brackets 26 may rest upon the flanged portions 22, at the forward corners of the bottom wall 16 of the enclosure, thereby supporting the cover in interlocked closed position on the enclosure. The clips 29 may receive the inwardly flanged edges 23 of the side walls 14, thereby causing the rearward edges of the side panels 25 of the cover to abut with and engage the forward edges of the side walls 14 of the enclosure. The side panels 25 of the cover member do not overlap the side walls 14 of the housing; but said panels 25 respectively are arranged to lie in the planes of the side walls 14 to form a continuation of said walls when the cover member is mounted in closed position upon the housing. Accordingly, the ends of the clips 29 extend but slightly beyond the edges of the panels 25 in order to interlockingly engage with the inner edges of the in-turned flanges 23. The upper edges of the side panels 25 may register substantially with the forward ends of the dependent lips 18 of the enclosure, said lips, if desired, being offset inwardly into the plane of the side walls 14 of the housing, forwardly of the in-turned flanges 23. The upper edge of the panel 24 of the cover accordingly may be supported in registering engagement with the downwardly facing edge of the enclosure member 20, thereby forming a substantially weather-tight housing. If desired, the upper edge of the panel 24 may be extended upwardly and offset rearwardly in the cover in position extending immediately in front of the lugs 28 whereby to enter the upper edge of said panel 24 behind the lower edge of the enclosure member 20.

Meter inlet and outlet conduit connection means 32 and 33 are adjustably mounted on and within the enclosure 12 in such fashion as to render the same readily connectable with any conventional meter which it may be desired to mount in the housing. To this end the housing is fitted with a support bracket preferably comprising a channel member, which may be formed from relatively heavy gauge sheet metal, or as a light weight metal casting, said bracket having a central portion 34 sized to extend horizontally between the spaced inner faces of the side walls 14 of the enclosure, said bracket being formed, at its ends, for engagement with said faces. To this end, the central portion 34 of the bracket may be formed with preferably integral flange portions 35 adapted to face and lie upon the inner surfaces of the side walls 14, said flanges 35 being formed with elongated slots 36.

The bracket is mounted and secured for vertical adjustment between the side walls 14 by bolts 37 mounted in the side walls and extending in the slots 36.

The central portion 34 of the bracket also is provided with elongated slots 38 formed longitudinally in the medial portion 34 adjacent each end of said portion. The inlet and outlet conduit means 32 and 33 preferably each comprises a semicircular pipe coupling element 39, 39' having a medial threaded stud 40 formed thereon in position extending upwardly through a slot 38 and hence suspended on the bracket, as by means of a bolt 41 and washer 42 on the stud 40. Each of the coupling elements 39, 39' has an end extending toward the other coupling element, which ends are connected with attachment fittings 43 for securing the elements 39, 39', respectively, with the inlet and outlet connections of a meter. Accordingly, any meter, such as the meter 44 indicated in broken lines in Fig. 2, may be disposed in the housing and connected with the pipe elements 39, 39', regardless of the physical size of the meter or the spacement of its inlet and outlet connections, the adjustment afforded by the slots 38 serving to adapt the housing to any meter inlet and outlet spacing within the conventional range; and the vertical adjustment of the suspension bracket afforded by the slots 36 allowing any meter of conventional size to be suspended on the bracket through the pipe coupling members 39, 39'.

The ends of the coupling elements 39, 39' remote from the meter attached ends thereof are connected respectively with conduit means adapted for connection with a supply pipe and with a customer's delivery pipe. To this end, the inlet conduit means may comprise a valve 45 coupled with the inlet connection 39 and with a T coupling 46 affording connection with a pipe section 47 extending outwardly of the housing through an opening 48 formed in the bottom wall 16 thereof, said T coupling providing means for carrying a removable conduit plug 49 within the housing for the attachment of test gauges or for otherwise examining the condition of the supply conduit. In this connection it will be seen that the T coupling, the valve 45, as well as all readily demountable pipe connections from the supply conduit to the meter are enclosed within the housing. The outlet conduit means 33 may comprise a pipe 50 connected with the outlet fitting 39' from the connected meter and extending thence downwardly alongside of the meter and outwardly of the housing through an opening 51 formed in the bottom wall 16.

It will be seen from the foregoing that the housing with inlet and outlet connections 32 and 33 assembled in place therein may be delivered at the site of installation ready to receive the meter therein and for connection of the meter with a gas supply conduit and with the customer's delivery pipe at the site of installation. If desired the meter may be installed in the housing at the factory or service workshop, thus enabling the housing and meter to be delivered as a unit ready for installation. Termination of the side walls 14 substantially behind the front of the enclosure member 12 facilitates installation of the meter in the housing. The back wall 15 of the housing also may be formed with slots or openings 52 for the reception of fastening elements, such as bolts, used for mounting the structure on any suitable or convenient support means.

After the meter has thus been installed, the housing may be closed and permanently sealed against tampering. When so sealed, enclosure of all readily disconnectable pipe couplings within the sealed housing will render tapping of the supply line in advance of the meter an undertaking of substantial difficulty without breaking or otherwise interfering with the housing and its sealing means. In this connection, the pipe 47 may extend downwardly from the housing, without any break, for connection with a supply pipe or main substantially beneath the ground surface to thereby minimize the danger of supply pipe tapping, in advance of the meter.

The meter 44, of course, should be assembled in the housing with its reading dial 53 facing forwardly toward the open front of the enclosure 12 and the front panel 24 of the cover, which more or less closely overlies the front of the mounted meter, is provided with a window opening 54, normally closed by a pane 55 of transparent material, such as heavy gauge glass, said pane being secured in support clips 56 mounted preferably on the inner face of the panel 24.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A meter enclosure comprising means forming a hollow housing having spaced apart side walls, a support bracket comprising a bar adjustably mounted at its opposite ends in said housing for adjusting movement between and along said side walls, a suspension member adapted for supporting connection with a meter and mounted on said bracket for adjustment thereon in a direction transversely of the direction of adjusting movement of the bracket.

2. A meter enclosure comprising means for forming a hollow housing having spaced apart side walls, a support bracket comprising a bar adjustably mounted at its opposite ends in said housing for adjusting movement between and along said side walls, a suspension member comprising a fluid flow conduit element adapted for supporting connection and fluid delivery connection with a meter and mounted on said bracket for adjustment thereon in a direction transversely of the direction of adjusting movement of the bracket.

3. A meter enclosure comprising means forming a hollow housing having spaced apart side walls, a support bracket comprising a bar adjustably mounted at its opposite ends in said housing for adjusting movement between and along said side walls, a pair of suspension members each comprising a fluid flow conduit element adapted for supporting connection and fluid delivery connection with a meter and mounted on said bracket for adjustment thereon in a direction transversely of the direction of adjusting movement of the bracket.

4. A meter enclosure comprising means forming a hollow housing having spaced apart side walls, a support bracket comprising a bar adjustably mounted at its opposite ends in said housing for adjusting movement between and along said side walls, meter suspension and connection means forming a fluid flow conduit adapted for supporting and fluid delivery connection with a meter within said housing, said meter suspension and connection means being mounted on said support bracket for adjustment thereon in a direction transversely of the direction of adjusting movement of the bracket, in said housing, and having a portion extending outwardly of said housing.

5. A meter enclosure comprising means forming a hollow housing having spaced apart side walls and a bottom wall, a support bracket comprising a bar adjustably mounted at its opposite ends in said housing for adjusting movement between and along said side walls, meter suspension and connection means forming a fluid flow conduit adapted for supporting and fluid delivery connection with a meter within said housing, said meter suspension and connection means being mounted on said support bracket for adjustment thereon in a direction transversely of the direction of adjusting movement of the bracket, in said housing, and having a portion extending outwardly of said housing through an opening in the bottom wall thereof.

6. A meter enclosure comprising means forming a hollow housing having spaced apart side walls, a support bracket comprising a bar adjustably mounted at its opposite ends in said housing for adjusting movement between and along said side walls, a suspension member comprising a fluid flow conduit element adapted for supporting connection and fluid delivery connection with a meter and mounted on said bracket for adjustment thereon in a direction transversely of the direction of adjusting movement of the bracket, and conduit means connected with said element and extending thence outwardly of said housing for connection with a fluid supply pipe.

7. A meter enclosure comprising means forming a hollow housing having spaced apart side walls, a support bracket comprising a bar adjustably mounted at its opposite ends in said housing for adjusting movement between and along said side walls, a suspension member comprising a fluid flow conduit element adapted for supporting connection and fluid delivery connection with a meter and mounted on said bracket for adjustment thereon in a direction transversely of the direction of adjusting movement of the bracket, and conduit means connected with said element and extending thence outwardly of said housing for connection with a fluid supply pipe, said conduit means comprising a pipe section extending outwardly of the housing and interconnected coupling elements connecting said pipe section with said suspension member, said coupling elements being disposed entirely within said housing.

8. A meter enclosure comprising means forming a hollow housing having spaced apart side walls, a support bracket comprising a bar adjustably mounted at its opposite ends in said housing for adjusting movement between and along said side walls, a suspension member comprising a fluid flow conduit element adapted for supporting connection and fluid delivery connection with a meter and mounted on said bracket for adjustment thereon in a direction transversely of the direction of adjusting movement of the bracket, conduit means connected with said element and extending thence outwardly of said housing for connection with a fluid supply pipe, said conduit means comprising a pipe section extending outwardly of the housing and interconnected coupling elements connecting said pipe section with said suspension member, said coupling elements being disposed entirely within said housing, and including a flow control valve and a fitting for a test element.

9. A meter enclosure comprising means forming a hollow housing, meter support means in and adjustably mounted on said housing in position to mount a meter in the housing, said housing comprising a box-like structure having side, top, bottom and back walls and an open front, the forward edges of said side walls terminating rearwardly of the front of said structure, and a demountable cover member having front and side panel portions and formed for interfitting engagement on said structure for closing the said open front thereof, said cover member being formed with an inspection window and bracing members connected to the front and side panel portions of said cover member, at the lower end thereof in position to rest upon the bottom wall of the box-like structure to thereby support the cover member upon said bottom wall in position closing the box-like structure.

10. A meter enclosure comprising means forming a hollow housing, meter support means in and adjustably mounted on said housing in position to mount a meter in the housing, said housing comprising a box-like structure having side, top, bottom and back walls and an open front, the forward edges of said side walls terminating rearwardly of the front of said structure, and a demountable cover member having front and side panel portions and formed for interfitting engagement on said structure for closing the said open front thereof, said cover member being formed with an inspection window, and bracing members connected to the front and side panel portions of said cover member, at its top and bottom respectively, said bracing members forming means for interlocking engagement with the top and bottom of the box-like structure to hold the cover member thereon in closed position.

11. A meter enclosure comprising means forming a hollow housing, meter support means in and adjustably mounted on said housing in position to mount a meter in the housing, said housing comprising a box-like structure having side, top, bottom and back walls and an open front, the forward edges of said side walls terminating rearwardly of the front of said structure, a demountable cover member having front and side panel portions and formed for interfitting engagement on said structure for closing the said open front thereof, said cover member being formed with an inspection window in said front panel, said cover member comprising a sheet metal member bent to form said front and side panels, a bracing member at the top of said sheet metal member and secured to the upper edges of said front and side panels, said bracing member being disposed in position for interfitting engagement within the top of said structure, and corner bracing brackets at the lower end of said sheet metal member and secured to the front and side panels in position to rest upon said bottom wall of said structure to support the cover in closed position on said structure.

12. A meter enclosure comprising a box-like structure forming a housing having side, top, bottom and back walls and an open front, the forward edges of said side walls terminating rearwardly of the front of said structure, a meter support bracket comprising a bar adjustably mounted at its opposite ends on said side walls for adjusting movement in said housing between and along said side walls, a pair of meter suspension members each forming a flow conduit element adapted for supporting and fluid delivery connection with a meter, means for mounting said suspension members on said bracket for adjustment thereon transversely of the direction of adjusting movement of the bracket in said structure, whereby to provide for adjustably mounting a meter in said structure, and a demountable cover for enclosing the front of said structure said cover comprising a sheet metal member bent to form front and side panel portions, a formed sheet metal bracing member at the top of said cover and secured to the upper edges of said front and side panel portions in position for inter-fitting engagement within the top of said structure, and sheet metal corner bracing brackets secured to said front and side panel portions at the lower end of said cover in position to rest upon the bottom wall of said box-like structure to support the cover in closed position thereon.

References Cited in the file of this patent

UNITED STATES PATENTS

| Number | Name | Date |
| --- | --- | --- |
| 920,649 | Radley | May 4, 1909 |
| 1,481,415 | Casper | Jan. 22, 1924 |
| 1,715,538 | Dean et al. | June 4, 1929 |
| 1,883,507 | Bond et al. | Oct. 18, 1932 |
| 2,250,977 | Walker | July 29, 1941 |
| 2,330,975 | Jackson | Oct. 5, 1943 |
| 2,476,119 | Smith | July 12, 1949 |
| 2,492,494 | Mueller | Dec. 27, 1949 |

FOREIGN PATENTS

| Number | Country | Date |
| --- | --- | --- |
| 39,153 | Denmark | Aug. 10, 1928 |